United States Patent [19]
Tweddle et al.

[11] 4,451,424
[45] May 29, 1984

[54] METHOD OF GELLING CAST, POLYSULFONE MEMBRANES

[75] Inventors: Thomas A. Tweddle, Orleans; William L. Thayer, Ottawa; Oleh Kutowy, North Gower; Srinivasa Sourirajan, Ottawa, all of Canada

[73] Assignee: Canadian Patents & Development Limited, Ottawa, Canada

[21] Appl. No.: 417,494

[22] Filed: Sep. 10, 1982

[30] Foreign Application Priority Data

Feb. 10, 1982 [CA] Canada .................................. 395978

[51] Int. Cl.$^3$ .............................................. B29D 7/06
[52] U.S. Cl. .................................... 264/216; 264/212; 264/331.11; 521/27; 525/906
[58] Field of Search ........... 264/184, 212, 216, 331.11; 210/500.2; 521/27; 525/906

[56] References Cited

U.S. PATENT DOCUMENTS 3,444,286  5/1969  King et al. ......................... 264/216
4,026,977  5/1977  Bourganel ......................... 264/216

FOREIGN PATENT DOCUMENTS 1133561  12/1968  United Kingdom .

Primary Examiner—Donald E. Czaja
Assistant Examiner—V. Fischbach
Attorney, Agent, or Firm—Francis W. Lemon

[57] ABSTRACT

Polysulfone cast films, including polyethersulfone cast films, are partially gelled with mineral acid prior to or during the conventional water gelation to control the porosity of and improve the productivity of reverse osmosis and ultrafiltration membranes thus produced. The partial gelation may be carried out prior to the water gelation by contacting the cast film with the mineral acid in a gaseous or aqueous form and the gaseous form may be diluted with air. The partial gelation may, in different embodiments, be carried out simultaneously with the conventional gelation by dissolving the mineral acid in the gelation liquid.

8 Claims, No Drawings

METHOD OF GELLING CAST, POLYSULFONE MEMBRANES

This invention relates to a method of gelling cast, polysulfone films to form reverse osmosis and ultrafiltration membranes.

It has already been proposed, for example, in U.S. Pat. No. 4,207,182, dated June 10, 1980, "Polymeric Compositions for Membranes", Marz, to manufacture polysulfone and polyethersulfone membranes by dissolving a known amount of the polymer in a suitable solvent, such as NMP (N-methylpyrrolidinone) or DMA (Dimethylacetamide), with or without a nonsolvent, such as PVP (polyvinylpyrrolidone), casting the solution as a film on a suitable surface and subsequently transferring the cast film into a gelation medium, such as water, so that the cast film sets into a membrane suitable for ultrafiltration and reverse osmosis applications. The average pore size on the membrane surface and the overall porosity of the membrane are largely controlled by the composition of the film casting solution and the film casting conditions.

In order to use polysulfone directly as ultrafiltration or reverse osmosis membranes, it is necessary to have a fairly high concentration of the polymer (10–30 wt%) in the casting solution with or without the presence of suitable additives to give the required viscosity so that films can be cast in flat, tubular, or hollow fiber forms. Published literature, such as, for example, "Ultrafiltration of Asymmetric and Composite Membranes," I. Cabasso, ACS Symposium Series No. 153, Synthetic Membranes, Vol. 1, Desalination, A. F. Turbak, Ed., American Chemical Society, 1981, pp. 267–291, does not give precise data on the cause and effect relationships connecting film casting conditions and the performance of resulting ultrafiltration membranes. This literature does, however, show that solvents such as NMP and DMA, nonsolvents such as PVP, methyl cellosolve, polyethylene glycols (PEG) and fatty acids, and gelation media such as air, water, isopropanol and DMA-water mixtures, have been successfully used for the production of ultrafiltration membranes. This literature does not give any precise criteria either for increasing the porosity, or controlling the porosity, or increasing water permeability at a given level of solute separation.

There is a need for a process for gelling cast, polysulfone and polyethersulfone films to form ultrafiltration membranes with more predictable and better membrane porosity.

According to the present invention there is provided a method of gelling cast, polysulfone films to form reverse osmosis and ultrafiltration membranes, wherein the cast film is gelled using water as a gelation liquid, the improvement comprising partially gelling the film with at least one mineral acid at a stage no later than when the film is gelled with the water.

In some embodiments of the present invention, the polysulfone is a polyethersulfone.

Preferably the mineral acid is at least one acid selected from the group consisting of sulfuric, hydrochloric, nitric and phosphoric acids.

In some embodiments of the present invention, the partial gelling of the cast film is carried out prior to the water gelation by contacting the cast film with the mineral acid in a substantially pure, gaseous form.

In other embodiments of the present invention, the partial gelling of the cast film is carried out prior to the water gelation by contacting the cast film with the mineral acid in gaseous form and diluted with air.

In yet other embodiments of the present invention, the partial gelling of the cast film is carried out at the same time as the water gelation by dissolving the mineral acid in the gelation water. In this case, the mineral acid is preferably sulfuric acid, and the sulfuric acid is dissolved in the gelation water in the range of the order of 10 to of the order of 40 wt% of sulfuric acid.

In other embodiments of the present invention, the partial gelation of the cast film is carried out prior to the water gelation by contacting the cast film with an aqueous solution of the mineral acid.

The mineral acid may be in aqueous or undiluted form and may be brought into contact with the cast film as a liquid or vapour.

In tests to verify the present invention, two kinds of polysulfone polymer membrane materials were used—polysulfone-Udel (PS-U-3500) [trademark], and polyethersulfone-Victrex (PS-V-200) [trademark]. These membrane materials were cast in a flat configuration under the following general conditions:

General Film Casting Conditions

Composition of film casting solution:
 polymer: PS-U-3500 or PS-V-200
 solvent: NMP or DMA
 nonsolvent: PVP-10000 [Sigma Chemical Co., St. Louis, U.S.A.] or PEG-600 [BDH Chemicals Ltd., Poole, England], when used.
Temperature of film casting solution: 23°–25° C.
Temperature of film casting atmosphere: 23°–25° C.
Film casting surface: glass, unless otherwise specified.
Solvent evaporation period prior to gelation: 1 min.
Residence period of membrane in the acid gelation bath: 5 min. (unless otherwise specified)
Solvent leaching medium: water at room temperature (3°–25° C.)
Solvent leaching period: at least one hour.

Tests to obtain the characteristics of membranes cast in this manner were carried out in conventional thin channel, ultrafiltration cells under the following experimental conditions:

Ultrafiltration Experimental conditions

Membrane material: PS-U-3500 or PS-V-200, as indicated
Membrane configuration: flat
Feed solution: 100 ppm PEG-6000 [BDH Chemicals Ltd.]-water
Operating pressure: 345 kPag (50 psig)
Operating temperature: room temperature (23°–25° C.)
Effective membrane area in UF cell: 14.5 cm$^2$
Feed flow rate in UF cell: 2000 cm$^3$/min The following Table I shows the effect of presence of different acids in the gelation bath on the UF performance of the resulting polysulfone membranes. The acids tested were sulfuric, hydrochloric, nitric and phosphoric, and the concentration of acid, when diluted in a gelation bath, was approximately 20% by weight. Since the effective membrane area (=14.5 cm$^2$) in the UF cell used and the operating conditions of the UF experiments were the same in all the runs in these tests, the data on solute separation and the membrane permeated product rate are directly comparable.

TABLE I

Effect of Different Acids Diluted in the Gelation Bath on Membrane Performance

Composition of film casting solution: polymer (PS-V-200): 25 solvent (NMP): 75

Temperature of gelation bath: 3-5° C.

| Composition of gelation bath | | water cm³ | acid cm³ | Membrane Performance solute sepn % | product rate g/h* |
|---|---|---|---|---|---|
| | | 2000 | — | 95 | 2 |
| $H_2SO_4$ | (98%) | 1600 | 400 | 89 | 189 |
| HCl | (37%) | 1080 | 920 | 36 | 485 |
| $HNO_3$ | (70%) | 1430 | 570 | 85 | 55 |
| Phosphoric | (85%) | 1530 | 470 | 59 | 114 |

*Effective film area: 14.5 cm²

Table I shows that, with pure water as the gelation medium, solute separation was 95% and product rate was 2 g/h. With the different acids diluted in the gelation medium, solute separations were in the range 36 to 89% and product rates were in the range 55 to 485 g/h. These results show that acid gelation produces membranes with significantly increased porosity. Further, with nitric acid diluted in the gelation medium, the solute separation was 85% and the product rate was 55 g/h; on the other hand, with sulfuric acid diluted in the gelation medium both solute separation and product rate increased, the former from 85 to 89%, and the latter from 55 to 189 g/h. These results show that the presence of sulfuric acid in the gelation medium tends to decrease the average size of pores and simultaneously increase significantly the effective number of such pores on the surface of the resulting membranes. The above data illustrate how acid gelation with aqueous sulfuric acid improves membrane performance, i.e. simultaneously increases both solute separation and product rate. Comparison with the corresponding data with pure water gelation shows that the use of sulfuric acid-water gelation medium increases both the average size of pores and the effective number of such pores in the resulting ultrafiltration membranes.

The following Table II shows the effect of the nonsolvent PVP-10000 or PEG-600 in the casting solution, effect of film casting surface, and the concentration of sulfuric acid in an acid-water gelation bath on the performance of the resulting polysulfone membranes.

Comparing the performance data for the films 1 and 2, in Table II, shows that membranes cast on polyester paper, with or without acid gelation, are more porous than those cast on glass plates. Furthermore, in both cases, acid gelation gives rise to membranes with average pore sizes on the membrane surface bigger than those obtained with pure water gelation. The data for the films 1 and 3, also shows that, even with pure water gelation, the partial replacement of NMP (solvent) with PVP (nonsolvent) in the casting solution increases the product rate for the resulting membranes without significantly reducing the solute separation, which means that the inclusion of PVP in the casting solution increases the effective number of pores in the resulting membrane. This result was confirmed with acid gelation which gave rise to membranes whose product rate and solute separation were higher than those obtained for membranes resulting from casting solutions containing no PVP. Comparing the performance data for the films 1 and 4, in Table II, shows that the partial replacement of NMP (solvent) with PEG (nonsolvent) in the casting solution, combined with acid gelation, produces more porous membranes. Thus, all the above data show that acid gelation gives rise to more productive and/or more porous polysulfone ultrafiltration membranes. Comparing performance data for film 1 at different acid concentrations in the gelation bath, in Table II, shows that acid concentrations beyond about 40% by weight decrease both the solute separation and the product rate in the resulting membranes, which indicate the existence of an optimum acid concentration for the gelation bath for maximum membrane productivity.

The following Table III gives five additional examples of improved polysulfone membrane performance caused by acid gelation.

The results shown in Table III, combined with those of Table II, show that acid gelation results in improved productivity both with PS-U and PS-V membranes. In example 2, the polymer was PS-V but the solvent was DMA; with pure water gelation, the resulting membrane gave a solute separation of 97% and a product rate of 49 g/h, whereas with acid gelation, the resulting membrane gave a solute separation of 86% and a product rate of 343 g/h. These results, combined with those in Table II, show that acid gelation results in improved

TABLE II

Effect of Concentration of Sulfuric Acid in Gelation Bath on Membrane Performance

| Composition of film casting solution: Solution No. | 1 | 2 | 3 | 4 |
|---|---|---|---|---|
| polymer (PS-V-200) | 25 | 25 | 25 | 25 |
| solvent (NMP) | 75 | 75 | 69 | 69 |
| nonsolvent (PVP-10000) | — | — | 6 | — |
| nonsolvent (PEG-600) | — | — | — | 6 |
| Film casting surface: | glass | polyester paper | glass | glass |

Temperature of gelation bath: 3-5° C.

| Composition of gelation bath | | Solution 1 | | Solution 2 | | Solution 3 | | Solution 4 | |
|---|---|---|---|---|---|---|---|---|---|
| Water cm³ | $H_2SO_4$ (98%) cm³ | Solute sepn % | PR* g/h | Solute sepn % | PR* g/h | Solute sepn % | PR* g/h | Solute sepn % | PR* g/h |
| 2000 | 0 | 95 | 2 | 74 | 175 | 90 | 93 | | |
| 1800 | 200 | 86 | 115 | | | | | | |
| 1600 | 400 | 89 | 189 | 38 | 434 | 91 | 253 | 84 | 226 |
| 1400 | 600 | 70 | 289 | | | 46 | 643 | | |
| 1200 | 800 | 12 | 737 | | | | | | |
| 1000 | 1000 | 8 | 429 | | | | | | |

*PR = product rate, effective film area = 14.5 cm² productivity of PS-V membranes for both solvents, DMA and NMP, in the casting solution, and so the decreased and the effective number of such pores increased by said gelation.

TABLE III

Examples of Improved Polysulfone Membrane Performance Caused by Acid Gelation

| Example No. | Composition of film casting solution | | | Composition of gelation bath | | Temp. of gelation bath | Nature of film casting surface | Membrane Performance | |
|---|---|---|---|---|---|---|---|---|---|
| | Polymer & its concn. wt. % | Solvent & its concn. wt. % | Nonsolvent & its concn. wt. % | Water cm³ | $H_2SO_4$ (98%) cm³ | | | Solute sepn. % | Product rate* g/h |
| 1 | PS(U-3500) 20% | NMP 80% | — | 2000 | 0 | 5° C. | glass | 79 | 6 |
| | | | | 1600 | 400 | 5° C. | glass | 80 | 274 |
| 2 | PS(V-200) 20% | DMA 80% | — | 2000 | 0 | 5° C. | glass | 97 | 49 |
| | | | | 1600 | 400 | 5° C. | glass | 86 | 343 |
| 3** | PS(V-200) 25% | NMP 69% | PVP 6% | 2000 | 0 | 5° C. | mylar | 82 | 155 |
| | | | | 1600 | 400 | 5° C. | mylar | 81 | 291 |
| 4 | PS(V-200) 20% | NMP 80% | — | 2000 | 0 | 23° C. | glass | 60 | 210 |
| | | | | 1200 | 800 | 23° C. | glass | 3 | 2100 |
| 5 | PS(V-200) 28% | NMP 66.4% | PVP 5.6% | 2000 | 0 | 3° C. | glass | 54 | 7 |
| | | | | 1500 | 500 | 3° C. | glass | 98 | 173 |

*Effective film area: 14.5 cm²
**Continuous casting on mylar improvement caused by acid gelation is not limited to any particular solvent used. In example 3, the polymer used was PS-V, the solvent was NMP, and the nonsolvent was PVP; the membrane was cast in a conventional continuous film casting machine on a mylar [trademark] sheet; the residence period for the incipient membrane in the acid bath was 5 minutes; with pure water gelation, the resulting membrane gave a solute separation of 82% and product rate of 155 g/h, whereas with acid gelation, the resulting membrane gave a solute separation of 81% and product rate 291 g/h. These results show that acid gelation results in improved productivity of PS-V membranes in continuous casting operation also. In example 4, the polymer was PS-V, and the solvent was NMP, and the temperature of the gelation bath was 23° C., instead of 3° to 5° C. used in the other examples; with pure water gelation, the resulting membrane gave a solute separation of 60% and a product rate of 210 g/h, whereas with acid gelation, the solute separation dropped to 3% and the product rate increased to 2100 g/h. These results show that acid gelation combined with variations in the temperature of the gelation bath can be used to control the average size of pores on the surface of the resulting membrane; in particular, a higher temperature of the gelation bath tends to increase the average size of pores on the surface of the resulting membrane. In example 5, the polymer was PS-V, the solvent NMP, and nonsolvent PVP; composition of the film casting solution and concentration of acid in the gelation bath were the variables; under the experimental conditions studied, with pure water gelation, the resulting membrane gave a solute separation of 54% and a product rate of 7 g/h, whereas with acid gelation, the solute separation increased to 98% and the product rate also increased to 173 g/h. These results show that acid gelation combined with variations in the composition of the film casting solution and the concentration of acid in the gelation bath can be used to control the average size and effective number of pores on the surface of the resulting membrane; in particular, under the experimental conditions used in example 5, the average size of pores on the membrane surface Acids react with basic solvents, such as NMP and DMA, forming salts which dissolve both in excess solvent and in water. The formation and dissolution of such salts were found to play an important role in controlling solvent/nonsolvent and water exchange during the gelation step, which in turn controls the size and effective number of pores on the surface of the resulting membranes. Since such acid-solvent reaction can also occur with the acid in the gaseous form, it is possible to achieve the results of acid gelation shown in Table III, by treating the membrane surface with dilute or substantially pure acid in the gaseous phase (pregelation treatment) followed by usual gelation. This is illustrated by the examples given in the following Table IV.

TABLE IV

Examples of Improved Membrane Productivity or Increased Membrane Porosity caused by Pretreatment of Surface of the Incipient Membrane by Dilute or Pure Hydrochloric Acid Gas prior to Subsequent Membrane Gelation in Water Composition of film casting solution:
polymer (PS-V-200): 20
solvent (NMP): 71
nonsolvent (PVP-10000): 9
Film casting surface: glass
Gelation medium: water at lab. temp. (~24° C.)

| Example | Pregelation Treatment | Solute sepn, % | Product rate, g/h* |
|---|---|---|---|
| Control | No pregelation treatment | 87 | 30 |
| 1 | Surface reaction with HCl gas diluted with air (<50% acid) for 10 seconds | 87 | 263 |
| 2 | Surface reaction with HCl gas diluted with air (<50% acid) for 20 seconds | 75 | 160 |
| 3 | Surface reaction with commercially pure HCl gas for 15 seconds | 0 | >2000 |

*Effective film area = 14.5 cm²

Table IV shows that with no pregelation treatment (control experiment), the solute separation was 87% and the product rate was 30 g/h. In example 1, the membrane surface was exposed to HCl gas diluted with air (with acid content <50%) for 10 seconds prior to gelation in lab temperature water. The productivity of the resulting membrane improved several fold as shown by the solute separation data of 87% and the product rate data of 263 g/h. When the exposure time of HCl gas-air mixture on the membrane surface was increased to 20 seconds (example 2), the productivity of the resulting membrane decreased; and, when the surface reaction was carried out with pure HCl gas (example 3) the average pore size on the membrane surface increased such that the resulting membrane gave practically no solute separation and a very high product rate. These results illustrate that by adjusting the concentration of acid in the gaseous stream and the time of exposure of the surface of the incipient membrane, the porous structure of the resulting membrane can be controlled and improved.

We claim:

1. In a method of gelling cast, polysulfone films to form reverse osmosis and ultrafiltration membranes, wherein the cast film is gelled using water as a gelation liquid, the improvement comprising, partially gelling the film with at least one mineral acid at a stage no later than when the film is gelled with the water.

2. A method according to claim 1, wherein the polysulfone is a polyethersulfone.

3. A method according to claim 1, wherein the mineral acid is at least one acid selected from the group consisting of sulfuric, hydrochloric, nitric and phosphoric acids.

4. A method according to claim 1, wherein the partial gelling of the cast film is carried out prior to the water gelation by contacting the cast film with the mineral acid in a substantially pure, gaseous form.

5. A method according to claim 1 wherein the partial gelling of the cast film is carried out prior to the water gelation by contacting the cast film with the mineral acid in gaseous form and diluted with air.

6. A method according to claim 1 wherein the partial gelling of the cast film is carried out prior to the water gelation by contacting the cast film with an aqueous solution of the mineral acid.

7. A method according to claim 1 wherein the partial gelling of the cast film is carried out at the same time as the water gelation by dissolving the mineral acid in the gelation water.

8. A method according to claim 7 wherein the mineral acid is sulfuric acid, and the sulfuric acid is dissolved in the gelation water in the range of the order of 10 to 40wt.% of sulfuric acid.

* * * * *